United States Patent [19]
Pivawer

[11] 3,835,206
[45] Sept. 10, 1974

[54] PROCESS FOR HYDROLYZING PYROPHOSPHATES

[75] Inventor: Philip M. Pivawer, Hamden, Conn.

[73] Assignee: Olin Corporation, New Haven, Conn.

[22] Filed: Dec. 20, 1972

[21] Appl. No.: 316,854

[52] U.S. Cl............. 260/983, 260/928, 260/933, 260/987, 260/988
[51] Int. Cl. ............................................. C07f 9/08
[58] Field of Search ................................. 260/983

[56] References Cited
OTHER PUBLICATIONS
Baddiley et al., "J. Chem. Soc.," (1949), pp. 815–821.

Primary Examiner—Anton H. Sutto
Attorney, Agent, or Firm—F. A. Iskander; T. P. O'Day

[57] ABSTRACT

The use of a tertiary amine to speed up the hydrolysis of pyrophosphates of the formula

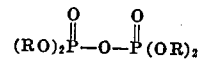

wherein R is an alkyl or haloalkyl radical.

12 Claims, No Drawings

PROCESS FOR HYDROLYZING PYROPHOSPHATES

This invention relates to the hydrolysis of pyrophosphates. More particularly, the invention relates to a catalytic process for the hydrolysis of pyrophosphates such as are formed in the preparation of tetrakis(2-haloalkyl) alkylene diphosphates.

The tetrakis(2-haloalkyl) alkylene diphosphates are highly useful as flame retardant additives in the production of polyurethane foam. A detailed description of the utility of these diphosphates is provided in U.S. Pat. No. 3,707,586 which issued to R. J. Turley on Dec. 26, 1972. The entire disclosure of this patent is incorporated herein by reference.

These diphosphates are advantageously prepared by a process which comprises reacting a bis(2-haloalkyl) phosphorohalidate with an alkylene glycol in the presence of a tertiary amine. For example tetrakis(2-chloroethyl) ethylene diphosphate is prepared by reacting bis(2-chloroethyl) phosphorochloridate with ethylene glycol in the presence of a tertiary amine such as pyridine. A detailed description of this type of reaction is provided in copending U.S. application Ser. No. 283,975, filed Aug. 25, 1972 now U.S. Pat. No. 3,803,272. The entire disclosure of that application is incorporated herein by reference. According to that process, the tertiary amine acts both as a catalyst and a scavenger for the hydrohalic acid which is formed as a by-product. However, along with its attributes, the use of the tertiary amine has been found to provide one drawback. This is that it results in the formation of pyrophosphate by-products. These by-products, formed by the reaction of the phosphorohalidate with traces of water, are substantially water-insoluble and very difficult to separate from the main diphosphate reaction product. Along with their general undesirability as impurities, they exert a detrimental effect when a diphosphate containing them is used as a flame retardant additive in polyurethane foam forming formulations. This stems from the fact that these pyrophosphates, over a prolonged period of time, slowly hydrolyze into acids which have a destructive effect on the amine catalysts which are conventionally used in the production of polyurethane foam.

The use of an inorganic base, e.g., sodium hydroxide, sodium carbonate, or sodium bicarbonate, to catalyze the hydrolysis of pyrophosphates is known in the art. However, the use of sodium hydroxide is undesirable in those applications in which the pyrophosphate to be hydrolyzed is contained in a mixture with other halogenated organic materials such as tetrakis(2-haloalkyl) alkylene diphosphate. This is in view of the fact that the presence of sodium hydroxide also causes the undesirable hydrolysis of such other halogenated materials. As to inorganic bases such as sodium carbonate or sodium bicarbonate, because of their relatively poor or slow catalytic effect, these materials are of little utility in applications where the speed of hydrolysis is of the essence.

The object of this invention is to provide a catalytic method for the rapid hydrolysis of pyrophosphates. A more specific object is to provide a simple method for selectively and catalytically hydrolyzing substantially water-insoluble pyrophosphates, which are contained in mixtures comprising tetrakis (2-haloalkyl) alkylene diphosphate, into water-soluble materials.

Toward these ends, a process has now been found, according to the invention, which comprises hydrolyzing substantially water-insoluble pyrophosphates in the presence of a tertiary amine catalyst. Thus a simple and fast method is provided for converting these pyrophosphates into water-soluble materials which can then be easily separated and removed from organic mixtures containing them.

The pyrophosphates which are hydrolyzed according to the process of the invention are generally well-known chemicals, and they are represented by formula I as follows

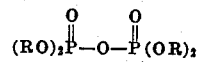
$$(RO)_2\overset{O}{\overset{\|}{P}}-O-\overset{O}{\overset{\|}{P}}(OR)_2 \qquad \text{I}$$

wherein R is an alkyl or a haloalkyl radical.

Any pyrophosphate of formula I may be catalytically hydrolyzed in accordance with the method of the invention. In these pyrophosphates the alkyl or haloalkyl radical represented by R usually contains 1–8, and preferably 1–4, carbon atoms; and the halogen in the haloalkyl radical is usually chlorine, bromine, or a mixture thereof. Thus illustrative of the R radical in formula I are methyl and its halogen derivatives such as chloromethyl and bromomethyl; ethyl and its halogen derivatives such as 2-chloroethyl, 2-bromoethyl and 2,2-dichloroethyl; propyl and its halogen derivatives such as 3-chloropropyl, 3-bromopropyl and 3-chloro-2-bromopropyl; butyl and its halogen derivatives such as 4-chlorobutyl and 4-bromobutyl; pentyl and its halogen derivatives such as 5-chloropentyl; hexyl and its halogen derivatives such as 6-bromohexyl; and octyl and its halogen derivatives such as 8-chlorooctyl.

Pyrophosphates of formula I in which R is a haloalkyl radical are preferred for use according to the invention. Illustrative of these are tetrakis (chloromethyl) pyrophosphate, tetrakis(bromomethyl) pyrophosphate, tetrakis(2-chloroethyl) pyrophosphate, tetrakis(2-bromoethyl) pyrophosphate, tetrakis(2-chloroisopropyl) pyrophosphate, tetrakis(2-bromoisopropyl) pyrophosphate, tetrakis(2,3-dichloropropyl) pyrophosphate, tetrakis(2,3-dibromopropyl) pyrophosphate, tetrakis(2,2'-dichloropropyl) pyrophosphate, and tetrakis(2,2'-dibromopropyl) pyrophosphate. Pyrophosphates in which R represents a monochloroalkyl or a monobromoalkyl radical are particularly preferred such as tetrakis (2-chloroethyl) pyrophosphate and tetrakis(2-bromoethyl) pyrophosphate.

Rapid pyrophosphate hydrolysis is achieved, according to the invention, in the presence of a tertiary amine hydrolysis catalyst. Any tertiary amine may be employed for this purpose. Thus the tertiary amine can be heterocyclic, such as N-methyl morpholine, heteroaromatic, such as pyridine, or a compound represented by formula II as follows

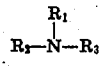
$$R_2-\overset{R_1}{\underset{|}{N}}-R_3 \qquad \text{II}$$

wherein each of $R_1$, $R_2$ and $R_3$ is independently a hydrocarbon radical.

The hydrocarbon radical represented by $R_1$, $R_2$ and $R_3$ in formula II can be for example any one of the following radicals:

an aliphatic radical a cycloaliphatic radical
a monoolefinic radical
a diolefinic radical
an aromatic radical
an aliphatic-aromatic radical Although none of the above-named radicals is limited with respect to the number of carbon atoms therein, usually the aliphatic radical contains 1–12, and preferably 1–8, carbons; the cycloaliphatic radical contains 3–12, and preferably 3–8, carbons; the monoolefinic and diolefinic radicals contain 2–12, and preferably 2–8, carbons; the aromatic radical contains 6–14, and preferably 6–10, carbons; and the aliphatic-aromatic radical contains 7–22, and preferably 7–14, carbons.

Illustrative of the aliphatic radicals represented by each of $R_1$, $R_2$ and $R_3$ in formula II are methyl, ethyl, propyl, isopropyl, butyl, pentyl, isopentyl, hexyl, heptyl, octyl, dodecyl, and the like.

Illustrative of the cycloaliphatic radicals represented by each $R_1$, $R_2$ and $R_3$ in formula II are cyclopentyl, cyclohexyl, cyclooctyl, cyclododecyl and the like.

Illustrative of the monoolefinic aliphatic radicals represented by each of $R_1$, $R_2$ and $R_3$ in formula II are vinyl, propenyl, butenyl, pontenyl, ethynyl, propynyl, butynyl, pentynyl, hexynyl and the like.

Illustrative of the diolefinic aliphatic radicals represented by each of $R_1$, $R_2$ and $R_3$ in formula II are 1,3-butadienyl, 1,2-butadienyl, 1,5-hexadienyl, 1,11-dodecadienyl and the like.

Illustrative of the aromatic radicals represented by each of $R_1$, $R_2$ and $R_3$ in formula II are phenyl, naphthyl, anthryl, phenanthryl and the like.

Illustrative of the aliphatic-aromatic radicals represented by each of $R_1$, $R_2$ and $R_3$ in formula II are tolyl, xylyl, 1,2,3-trimethyl phenyl, 1,2-diethyl phenyl, 1,2,3-tripropyl phenyl, 9-methyl anthryl, isobutyl phenyl, t-butyl phenyl, t-octyl phenyl, nonyl phenyl, and the like.

Illustrative tertiary amines which may be employed according to the invention include the following:
pyridine
trimethyl amine
triethyl amine
picoline
tributyl amine
N-methyl morpholine
quinoline
isoquinoline
quinuclidine
2,2'-oxybis-(N,N-dimethylethylamine)
the N,N,N',N'-tetraethyl ethylene diamine hydrohalides
N,N,N',N'-tetramethylbenzidine
N,N,N',N'-tetramethyl-1,4-butanediamine
3-acetoxypyridine
2-acetylpyridine
3-acetylpyridine
4-acetylpyridine
2-benzoylpyridine
3-benzoylpyridine
4-benzoylpyridine
2-benzylpyridine
4-benzylpyridine
2-bromopyridine
3-bromopyridine
4-bromopyridine
4-tertiary-butylpyridine
2-(p-chlorobenzoyl)-pyridine
4-(p-chlorobenzoyl)-pyridine
4-(p-chlorobenzyl)-pyridine
2-chloro-6-ethoxypyridine
2-chloro-4-picoline
6-chloro-2-picoline
2-chloropyridine
3-chloropyridine
4-chloropyridine
2,3,6-collidine
collidine
2-cyano-6-methylpyridine
3-cyano-5-methylpyridine
4-cyano-4-phenylpiperidine
2-cyanopyridine
3-cyanopyridine
4-cyanopyridine
2,6-diacetylpyridine
2,5-dibromopyridine
3,5-dibromopyridine
2,3-dichloropyridine
3,5-dichloropyridine
2-methylpyridine
2,6-dimethoxypyridine
3-methylpyridine
2-dimethylamino-5-nitropyridine
2-dimethylaminopyridine
4-dimethylaminopyridine
4-methylpyridine
2-ethylpyridine
3-ethylpyridine
4-ethylpyridine
2,4-lutidine
2,6-lutidine
3,4-lutidine
3,5-lutidine
2-methyl-5-vinylpyridine
2-phenylpyridine
4-phenylpyridine
2-vinylpyridine
4-vinylpyridine The preferred tertiary amines for use according to the invention are those which are water soluble. Pyridine and its derivatives are particularly preferred for use according to the invention. These derivatives include for example:
the methylpyridines
the ethylpyridines
the collidines
the lutidines
the vinylpyridines
2-methyl-5-vinylpyridine In carrying out the process of the invention, water and a tertiary amine are added to the pyrophosphate or to a mixture containing it. Suitable means, such as a mechanical agitator, is used to achieve adequate mixing of these ingredients. The water may be used in any convenient proportion. Usually, however, at least one mole of water is employed per each mole of the pyrophosphate.

Although any suitable proportion of the tertiary amine may be employed, in practice usually at least one mole, and preferably about 3–100 moles, are employed per each mole of pyrophosphate.

After the water and the tertiary amine have been added to the pyrophosphate or to a mixture thereof, hydrolysis will take place spontaneously as these materials are mixed together. In some instances it may be desirable to utilize heat in order to further speed up the hydrolysis rate. However, according to the invention, it is preferred to carry out the hydrolysis at a temperature below about 60°C. and more preferably between about 0° and about 50°C.

The process of the invention is of utility in connection with the production of tetrakis(2-haloalkyl) alkylene diphosphate by the reaction of a bis(2-haloalkyl) phosphorohalidate with an alkylene glycol. As noted earlier, this reaction is advantageously carried out in the presence of a tertiary amine which acts both as a catalyst and acid scavenger. A reaction product mixture is thus obtained which comprises tetrakis(2-haloalkyl) alkylene diphosphate, a tertiary amine hydrohalide and water-insoluble pyrophosphate by-products. The practice of the present invention enables the rapid hydrolysis of the pyrophosphate by-products into water-soluble materials which can then be easily separated and removed by means of a water wash. To this end, the tertiary amine hydrolysis catalyst may be added directly to the reaction product mixture along with water; or as an alternative route, a base, such as sodium bicarbonate, may be used to react with the tertiary amine hydrohalide by-product thereby freeing the tertiary amine which could then be used to catalyze the hydrolysis. A still further alternative would be to carry out the reaction of the bis(2-haloalkyl) phosphorohalidate and the alkylene glycol in the presence of an excess amount of tertiary amine over that which is required to catalyze that reaction and scavenge the hydrohalic acid which is formed. Such excess would then be available to act as a catalyst in the hydrolysis of the pyrophosphates. It is to be noted that a further attribute of the process of the invention is that if excess bis(2-haloalkyl) phosphorohalidate reactant is used in preparing the tetrakis(2-haloalkyl) alkylene diphosphate, this excess is also hydrolyzed and rendered water-soluble, thereby enabling its separation, along with the pyrophosphate, from the reaction product mixture.

After being rapidly hydrolyzed to water-soluble materials, the pyrophosphate derivatives are easily separated and removed by means of a water wash. Thus it is dissolved in water, which may be already present in the mixture or added separately, and the water is subsequently removed by phase separation.

The process of the invention is of particular utility in separating tetrakis(2-chloroethyl) pyrophosphate from a mixture comprising tetrakis(2-chloroethyl) ethylene diphosphate which is a highly effective flame retardant for polyurethane foam. Such a mixture obtains when bis(2-chloroethyl) phosphorochloridate is reacted with ethylene glycol in the presence of a tertiary amine. The practice of the method of the invention provides a fast and simple route for converting the pyrophosphate in this mixture into a water soluble material, without otherwise affecting the main product of the reaction, which is then easily removed by washing the mixture with water. Once freed of pyrophosphate and other easily removable by-products, the tetrakis(2-chloroethyl) ethylene diphosphate can then be used to great advantage as a flame retardant additive in polyurethane foam.

The following example is provided to illustrate the invention. In this example, all parts and percentages are by weight unless otherwise specified.

EXAMPLE

To a solution mixture comprised of 10 grams of tetrakis(2-chloroethyl) pyrophosphate, 90 grams of tetrakis(2-chloroethyl) ethylene diphosphate and 100 grams of ethylene dichloride, there were added 150 grams of water and 7.4 grams (about 0.1 mole) of pyridine. The mixture was stirred for 10 minutes and a sample was removed for pyrophosphate analysis by nuclear magnetic resonance (NMR). The sample was identified as S-10. The remainder of the mixture was stirred for an additional period of 30 minutes, whereupon another sample, S-40, was removed for analysis.

Both samples were analyzed by NMR for their content of phosphorus which is attributable to the pyrophosphate, the original content being of course 10%. The results of the analysis are provided below:

| % Pyrophosphate Phosphorus | |
| --- | --- |
| Originally | 10 |
| In S-10 | 5 |
| In S-40 | Less than 1%* |

*No phosphorus was detected by NMR, indicating a content under 1%.

What is claimed is:
1. The process of converting a substantially water-insoluble pyrophosphate, which is present in a mixture obtained in the preparation of tetrakis(2-haloalkyl) alkylene diphosphate, into a water-soluble material by hydrolysis in the presence of a tertiary amine, said pyrophosphate having the formula

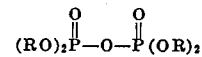

wherein R is an alkyl radical having 1-8 carbon atoms or a haloalkyl radical having 1-8 carbon atoms, the halogen in said haloalkyl radical being selected from the group consisting of chlorine, bromine, and a mixture thereof.

2. The process of claim 1 wherein said tertiary amine is water soluble.

3. The process of claim 2 wherein said R radical contains 1–4 carbon atoms.

4. The process of claim 3 wherein said R radical is haloalkyl.

5. The process of claim 4 wherein said hydrolysis is carried out at a temperature of about 0°–50°C.

6. The process of claim 5 wherein said tertiary amine is selected from the group consisting of pyridine, methyl pyridine, ethyl pyridine, collidine, lutidine, vinyl pyridine and 2-methyl-5-vinylpyridine.

7. The process of claim 6 wherein said tertiary amine is employed in a proportion of at least about one mole per each mole of said pyrophosphate.

8. The process of claim 7 wherein said R radical is monochloroalkyl or monobromoalkyl.

9. The process of claim 8 wherein said pyrophosphate is tetrakis(2-chloroethyl) pyrophosphate and said tetrakis(2-haloalkyl) alkylene diphosphate is tetrakis(2-chloroethyl) ethylene diphosphate.

10. The process of claim 9 wherein said mixture is obtained by the reaction of bis(2-chloroethyl) phosphorochloridate with ethylene glycol in the presence of a tertiary amine.

11. The process of claim 10 which comprises the added step of separating and removing said hydrolyzed pyrophosphate by washing with water.

12. The process of claim 11 wherein said tertiary amine is pyridine.

* * * * *